United States Patent [19]

Garden

[11] Patent Number: 4,920,695
[45] Date of Patent: May 1, 1990

[54] CONTAINER SYSTEM FOR GROWING PLANTS

[75] Inventor: Jeffrey S.S. Garden, Aberdeen, Scotland

[73] Assignee: Ceretech Limited, Oak Harbor, Wash.

[21] Appl. No.: 227,911

[22] PCT Filed: Jan. 30, 1987

[86] PCT No.: PCT/GB87/00066

§ 371 Date: Jul. 27, 1988

§ 102(e) Date: Jul. 27, 1988

[87] PCT Pub. No.: WO87/04589

PCT Pub. Date: Aug. 13, 1987

[30] Foreign Application Priority Data

Jan. 31, 1986 [GB] United Kingdom ............ 8602460
Mar. 22, 1986 [GB] United Kingdom ............ 8607173

[51] Int. Cl.⁵ ............................................. A01G 9/02
[52] U.S. Cl. ................................................ 47/83; 47/67
[58] Field of Search .............. 47/66, 67, 73, 77, 78, 47/79, 82, 83; 446/120, 478

[56] References Cited

U.S. PATENT DOCUMENTS

| | | | |
|---|---|---|---|
| 4,034,508 | 7/1977 | Dedolph | 47/84 |
| 4,123,873 | 11/1978 | Canova | 47/83 |
| 4,161,085 | 7/1979 | Moffett | 47/67 |
| 4,683,674 | 8/1987 | Faul | 47/83 |

FOREIGN PATENT DOCUMENTS

| | | |
|---|---|---|
| 63215 | 10/1982 | European Pat. Off. . |
| 7330259 | 3/1973 | France . |
| 1580039 | 11/1980 | United Kingdom . |
| 2055281 | 3/1981 | United Kingdom . |
| 1604846 | 12/1981 | United Kingdom . |
| 2154414 | 9/1985 | United Kingdom . |

Primary Examiner—Robert A. Hafer
Assistant Examiner—Lynda M. Cofsky
Attorney, Agent, or Firm—Andrus, Sceales, Starke & Sawall

[57] ABSTRACT

A container system for growing plants includes a container and a growing medium. The container comprises one or more flat but flexible wall panels (10, 10', 10", 62) and connectors (12, 12', 12", 24 and 25, 66) for joining adjacent wall panel edges to form a continuous container wall. The panels have openings (18, 90, 98) through which plants (40) can be grown. Openings not in use are closed by integral flaps (16, 63), which spring open or shut owing to the curvature of the panels and the flexibility of the panel walls, and snap shut into the openings. Long panel connectors include channels (20, 28) for receiving and engaging complementary panel edges, and stiffen the containers. Perforated irrigation tubes (44) may stand in the assembled containers and pass through apertured top caps (50); bottom caps (50, 70) provide drainage. The containers can be extended in size by connecting further wall panels, and some can be stacked. A growing medium for use in the containers comprises a 4:1 mix of young sphagnum moss peat sized between 20 mm and 40 mm and perlite sized between 3 mm and 6 mm, with mineral additives and a wetting agent.

8 Claims, 6 Drawing Sheets

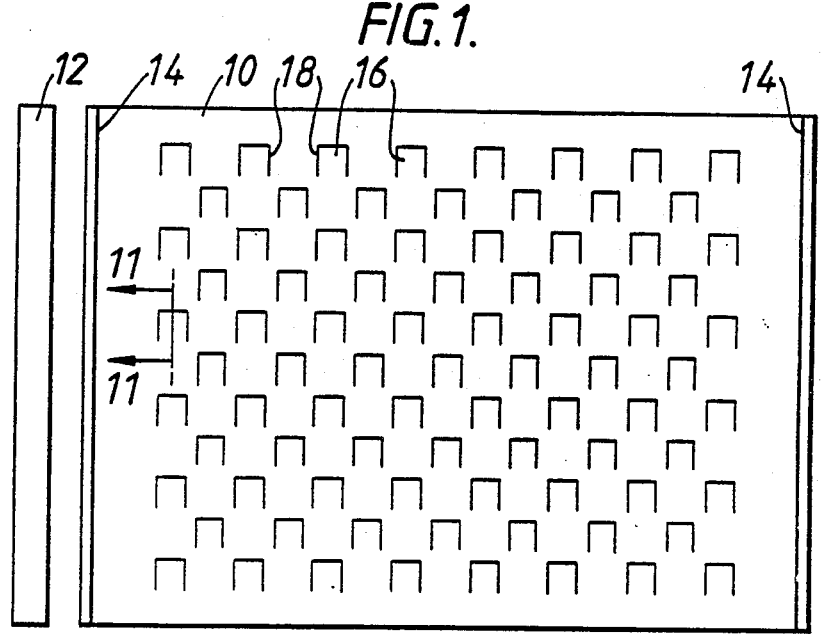
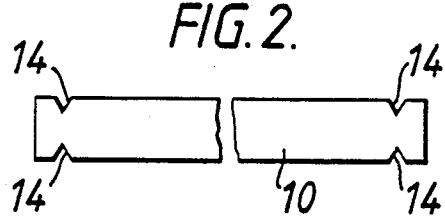
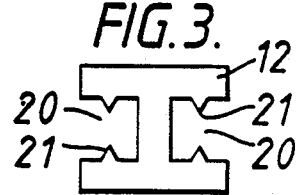
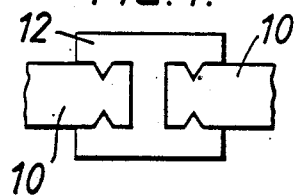
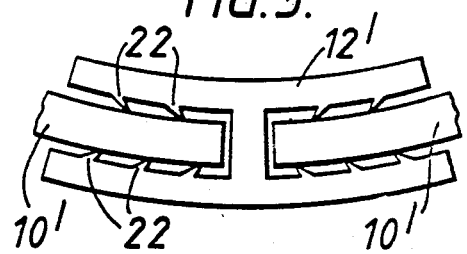

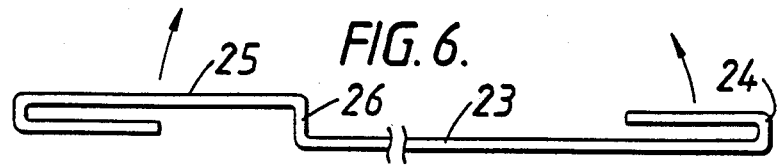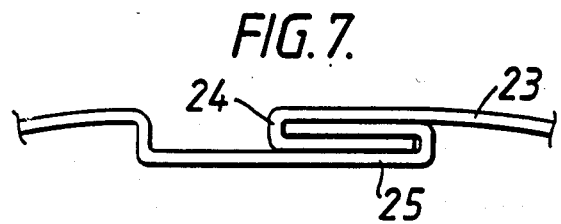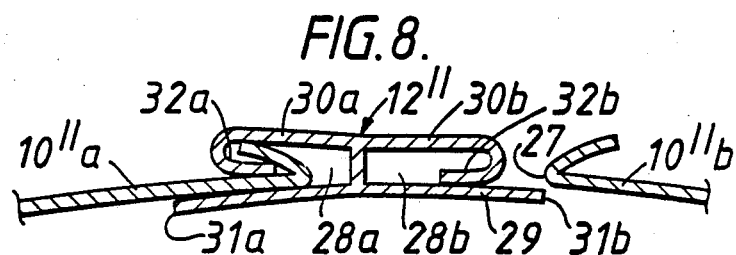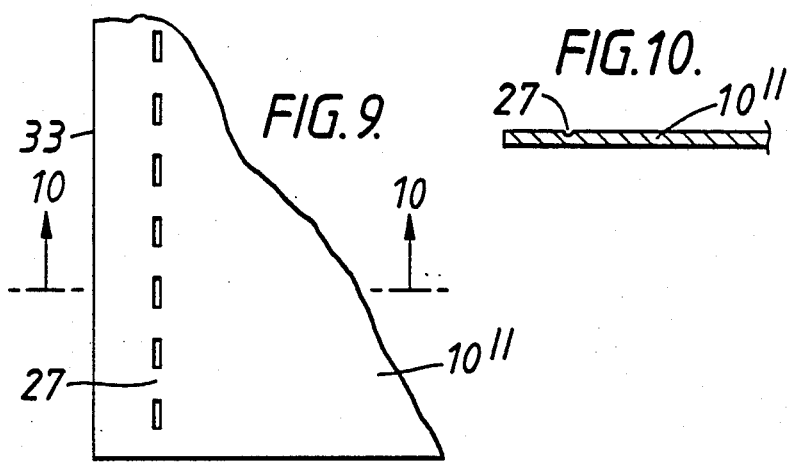

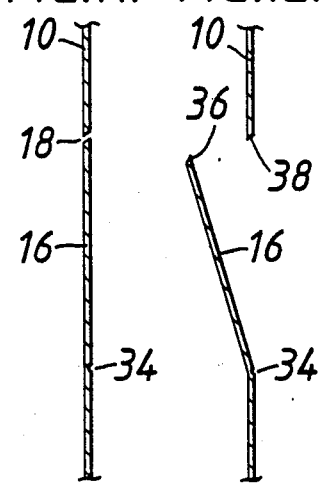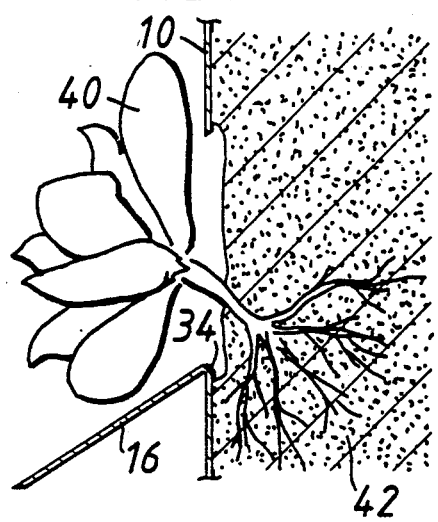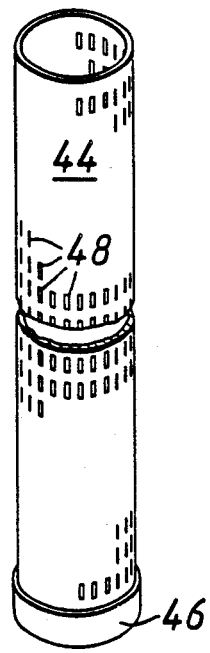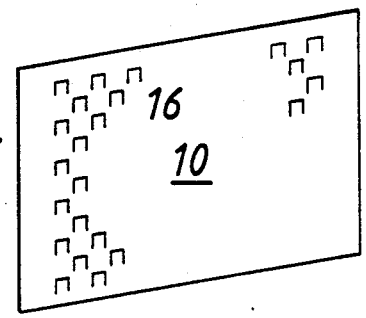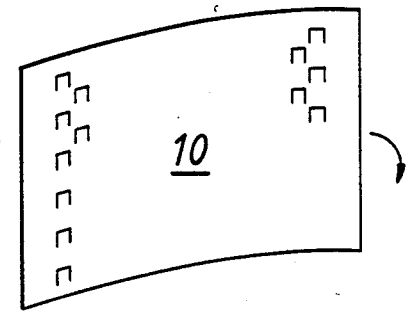

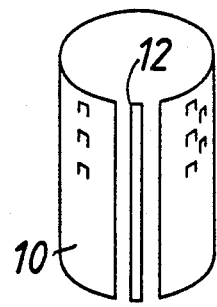
FIG.15c.
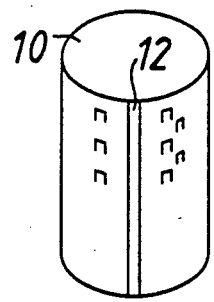
FIG.15d.
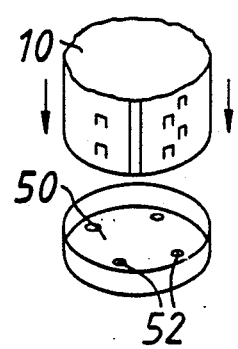
FIG.15e.
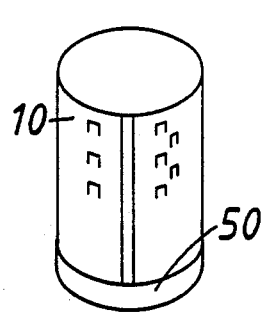
FIG.15f.
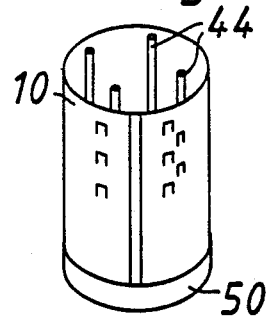
FIG.15g.
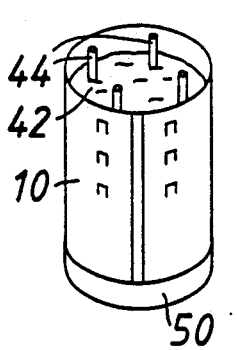
FIG.15h.
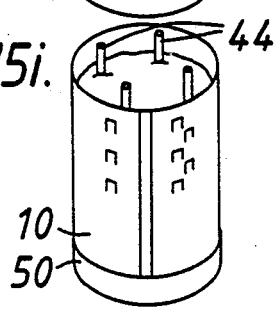
FIG.15i.
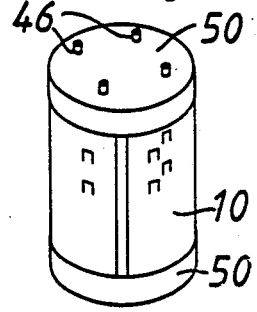
FIG.15j.

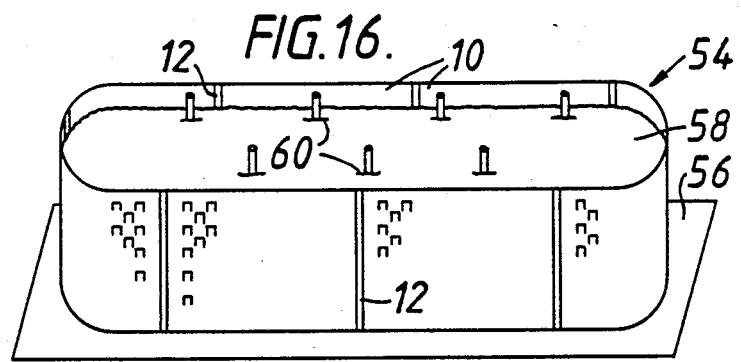
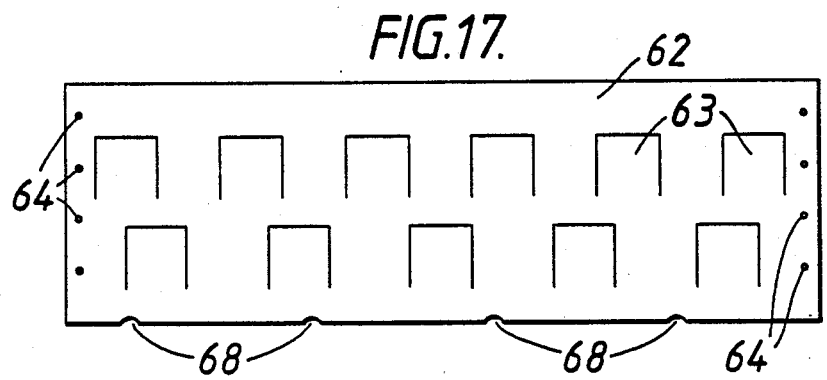
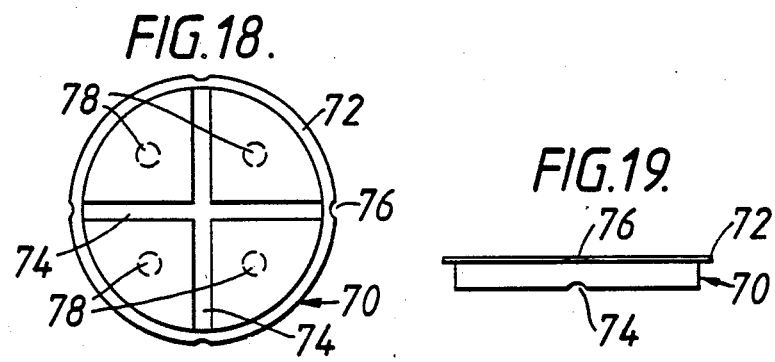
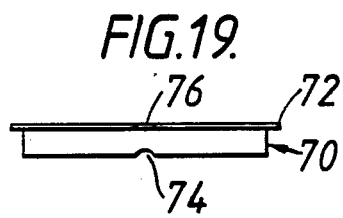

CONTAINER SYSTEM FOR GROWING PLANTS

This invention relates to a container system for growing plants in a growing medium.

Containers for a growing medium in which a number of plants can be grown at one time are known. Some are small plastics containers or small clay pots, such as are sold for growing herbs in the kitchen, while others are larger and more complex container systems. Some are claimed to meet the needs of commercial growers as well as of amateur growers. There are some low cost systems that are based on the use of thin plastics bags, which are simply cut to expose the growing medium and to provide the openings into which seedlings can be planted, but these bags tend to degrade and have short useful lives.

One disadvantage of many known containers is that they are of fixed sizes, or are at least not readily extended. There is a need for a low cost container, particularly for the production of vegetables, that would be of high strength and durability and would have particular application among poorer peoples or in the developing world. Such a container would be adaptable to whatever size was required. A suitable container should also be readily and economically manufactured and shipped, and would be usable with a variety of growing media, including the growing media that are most available in the country of use.

A container system which includes both a container and a growing medium, in which the container and the medium are adapted to one another, is especially desirable. The combination should ensure that the plants are able to receive light and warmth and have adequate supplies of water and air. The medium must be able to supply plenty of water, especially in climates which expose the plants to high light intensity or temperature, but too much water can mean that the roots become short of air. A container in which plants are grown at different vertical levels needs a growing medium which can give an even and correct distribution of water, air spaces and fertiliser. An unsuitable growing medium will compact at lower levels in the container and may eventually form a pan that is substantially impermeable to water.

According to the present invention, a container for a growing medium for plants comprises at least one wall panel and panel connector means connecting together adjacent wall panel edges to form a continuous container wall; the at least one wall panel being generally stiff but capable of being resiliently flexed between planar and curved configurations, and being provided with openings through which plants can be grown and closure means therefor; the closure means being flaps that are integral with the panel and which open outwardly to form the openings.

Such a container can be formed from one wall panel or from a plurality of wall panels, connected edge to edge by the connector means. The wall panels will normally be vertical with connections between adjacent vertical edges, and the container may have any number of straight and curved wall panels to make up the desired container shape and size. At its smallest, the container will consist of a single panel flexed into an upright cylinder with edge connector means joining the opposed vertical panel edges.

A flap may be formed by making a non-linear cut through the panel, a hinge for the flap being defined between the opposite ends of the cut. The cut is suitably made along three sides of a quadrilateral or along the major part of the circumference of a closed curve, the hinge being defined along the fourth side of the quadrilateral or along a chord of the curve respectively.

This method of forming the closures simplifies and reduces the costs of production and packaging compared with the alternative of making separate closures and fixing them individually in place. There is far less material wastage and no risk of losing the closures between growing seasons. The panels are manufactured with closures in place and, if flat, can be packaged and shipped in convenient stacks.

In order to facilitate movement of the flap about the hinge, it is preferred that the hinge be further defined by a crease or a shallow cut or groove made into the material of the panel along the line of the hinge, reducing the panel stiffness at the hinge line. A cut or groove, both of which are referred to hereinafter as a hinge cut, is preferably on the inner face of the panel.

The hinge also provides a means of keeping the openings closed or open as required. This benefit arises in panels that are curved in the assembled container, which will normally be the case with most or all of the panels, when the line of the hinge is also curved as a result of the curvature of the panel. In this case, opening the closure flap results in a local distortion of the panel, since the curved hinge line tends to straighten as the flap is turned outwardly from the panel. The resilient stiffness of the panel urges the flap back towards the panel surface, with the result that the flap has two stable positions; one is the fully closed position, and the other is an open position tending towards 180° from the closed position, this precise open position being dependent however on the resistance of the hinge to further opening. In practice, when the hinge is new, its stiffness will allow a considerable range of positions to be taken by the flap.

To obtain the greatest effect, the curved hinge line should be horizontal when the wall panels are vertical and curved in their ground plan. To further aid the flaps to remain closed when so required, the non-linear cut in the panel that forms the flap may be made at an angle to the panel surface, so that angled lips are formed on the cut edges, the lip on the flap edge being towards the inner face of the flap and the lip on the panel being towards the outer face of the panel. The angle of the cut will depend on the panel thickness and should be chosen so that there is a snap action between the lips sufficient to retain the flap in the opening when the flap is closed, but with not so much interference that the flap cannot be readily opened when required.

A cut perpendicular to the panel surface, with no angled lips, may also be sufficient to hold a flap closed, if the panel is of appreciable thickness and the material is such that the abutting cut edges show sufficient mutual friction. This can be achieved with the preferred panel material, polypropylene, and other plastics.

The most preferred position for the hinge line is horizontal at the lower-most edge of the flap. This allows the flap to open outwards and provide both a support for growing medium that may spill somewhat from the interior of the container, and a shelter for newly planted seedlings which nevertheless allows them to receive sunlight. As the plants grow, the flaps may be opened wider. The hinge at the base of an outwardly opening flap also tends to retain water in the container during irrigation.

The flaps may be distributed over each wall panel at a variety of heights and horizontal spacings.

Closure means for the wall panel openings ensure that excessive moisture is not lost by evaporation through openings that are not currently in use for growing plants, and moisture loss from the top surface of the growing medium within the container can be substantially prevented by covering the medium with, for example, plastics sheeting, or by using a pre-formed cap adapted to engage the top edges of the wall panel or panels. Such a cap is designed for a specific container size and shape. A cap which embraces the top edges of the wall panel or panels also serves to help maintain the desired ground plan of the container against outward pressure from the weight of the growing medium within. A similar cap, preferably with drain holes, may be provided at the base of the container to prevent loss of growing medium and to reinforce the structure at the base of the connected wall panels.

The panel connector means may take several forms. For example, they may comprise a plurality of individual connector elements; they may be integrally formed with the panel edges; or they may comprise separate suitably elongate connector members of a length substantially equal to the lengths of the panel edges to be joined, provided with means for engaging the adjacent panel edges.

Connectors of this last kind are especially preferred. They may be used with flat panels, which have advantages in packaging and shipping. They also provide vertical reinforcement for the panels, especially for flat panels.

These connectors suitably comprise two parallel channels, that is to say channels extending along parallel lines or axes, for receiving and engaging two panel edges. The angle between the channel openings determines the angle between the joined wall panels. In order to provide a robust joint between panel and connector, complementary gripping surfaces may be provided on the panel wall surfaces that are to be received in the channels and on the inside wall surfaces of the channels. Such complementary surfaces may include a bead extending along a channel or panel surface and a corresponding groove for receiving the bead in a panel or channel surface to cooperate therewith; or may include one or a plurality of beads formed as inwardly raked teeth on the opposite side surfaces of the channel and roughened or milled wall surfaces at the panel edge that are adapted to be gripped by the teeth when the panel edge is inserted into the channel.

A preferred panel connector means of this kind, which is simple to manufacture, easy to construct and provides a strong connection between the panels, comprises a connector member having two channels for receiving and engaging two panel edges, each channel being defined between two arms, and at least one arm of each channel being provided with an inwardly directed flange, and means enabling the panel to be resiliently folded adjacent its edge, such that when a folded edge of a panel is inserted into a channel said folded edge engages said flange, preventing the panel from being withdrawn outwardly from the channel.

Said means enabling the panel to be folded preferably comprises a line of localised weakening of the panel adjacent the edge thereof. This may be in the form of a series of spaced cuts, half-cuts and/or grooves, especially when the material of the panels is plastics such as polypropylene or PVC. The cuts or grooves along said line are made sufficient to provide the localised weakening required to fold the edge but only against the resilience of the material attempting to restore the panel to its former unfolded shape. This ensures that the folded edge engages said flange when it is inserted into the connector channel.

Again the panel can be manufactured and packaged flat, the edges being folded only when the container is to be assembled.

A container in accordance with the invention may also include one or more irrigation tubes each provided with a plurality of side apertures and having one open or openable end. When such a tube is positioned in growing medium in an assembled container with its open or openable end above the surface of the growing medium, the tube can be filled with water when irrigation is required and the water will seep into the growing medium through the apertures in the tube. These tubes are most simply straight tubes of a similar length to the height of the container walls, and are placed upright inside the container. The tubes can be manufactured in continuous lengths and cut to size. Close fitting end caps may be provided for each end, the lower end then being kept permanently closed and the upper end cap being removed when water needs to be added to the tube.

The use of irrigation tube overcomes some of the disadvantages of always watering a growing medium downwardly from its top surface, which in the long term can change the vertical distribution of nutrients and other chemical species in the medium, as well as compacting and stratifying an unsuitable growing medium. Plant nutrients can be added in the irrigation water and distributed more evenly through the growing medium, so that plants growing in the lower wall panel openings can be irrigated as effectively as plants growing in the upper wall panel openings.

The invention further provides a growing medium comprising a mixture of, by volume, 40 to 90% fibrous peat sized to pass a 40 mm mesh screen but not a 20 mm mesh screen, and 60 to 10% perlite sized to pass a 6 mm mesh screen but not a 3 mm mesh screen; a fertiliser; and a wetting agent; the medium having a pH of 5.8 to 6.5.

As fertiliser, it is preferred to use mineral additives comprising ammonium nitrate, potassium nitrate, single superphosphate (a fertiliser containing about 18% superphosphate, consisting of a mixture of calcium sulphate and dihydrogen calcium phosphate normally made by treating bone ash or basic slag with sulphuric acid), rock phosphate (phosphorite), dolomite of lime (dolomitic limestone), and trace elements as inorganic salts with chelated iron.

The fertiliser is desirably such that the medium contains the following mineral nutrients, measured in milligrams per liter of medium:
Nitrogen 100 to 165, preferably about 110
Phosphorus 60 to 105, preferably about 70
Potassium 150 to 240, preferably about 160
Boron 0.5 to 0.7, preferably about 0.5
Copper 3.3 to 4.4, preferably about 3.3
Manganese 1.7 to 2.4, preferably about 1.7
Iron 3.5 to 5.2, preferably about 3.5
Zinc 0.7 to 1.5, preferably about 0.7
Molybdenum 0.5 to 0.7, preferably about 0.5

The preferred peat is young *Sphagnum Fuscum* moss peat. Young peat is considered to be peat less than about 5,000 years old. A suitable peat of this kind can be found in Finland. Preferably the peat is sized to be held up on a 30 mm mesh screen. The sizing of the peat and perlite is an important factor in giving the medium the necessary qualities for use in vertically oriented containers.

The preferred proportion of peat to perlite is about 4:1 by volume. The prefered pH is about 5.8. The preferred wetting agent is a nonionic detergent.

It has been found that the growing medium of the invention is able to retain large amounts of water while allowing plenty of air for the roots of the plants. It has excellent ion exchange properties which absorb excess nutrients and release them slowly to the plants. It has been found that the medium does not pan down through constant watering and can be very easily re-wetted if allowed to dry out.

The nutrient mix is well balanced and suited to the bulk materials. The medium is well suited to successfully growing plants in the containers of the invention in extremes of temperature, including very hot climates, and will perform for at least three years providing that a balanced fertiliser with trace elements is used after the first 6 to 8 weeks and the medium has not been completely infested with roots (which would interfere with the water and air retention properties of the medium). Plant seedlings react quickly after planting, at high and low planting heights in the containers, and the medium retains a substantially uniform pore size and moisture content.

Growing plants using the medium and container according to the invention, with end caps on the container tops, in very dry summers, has been found to use as little as 1/20 of the water, and 1/7 of the fertiliser, as would be required to grow the same plants by conventional gardening methods.

The invention accordingly further provides a container system for growing plants, comprising a container and growing medium as aforesaid.

The invention is illustrated by way of example in the accompanying drawings, in which:

FIG. 1 is a front elevation of a vertical wall panel and panel connector means;

FIG. 2 is a broken plan view of the panel of FIG. 1;

FIG. 3 is a plan view of the connector means of FIG. 1;

FIG. 4 is a plan view of the connector means joining two adjacent panel edges;

FIG. 5 is a plan view of alternative connector means joining two alternative panel edges;

FIG. 6 is a broken plan view of a further alternative wall panel having integral connector means at the panel edges;

FIG. 7 is a plan view of a connection made between the two opposite vertical edges of the panel of FIG. 6;

FIG. 8 is a section through further alternative connector means;

FIG. 9 is a broken elevation showing a corner of a panel wall for use with the connector means of FIG. 8;

FIG. 10 is a section along the line 10—10 of FIG. 9;

FIG. 11 is a section taken on the line 11—11 through the wall panel shown in FIG. 1;

FIG. 12 is a view similar to FIG. 11 showing the hinged flap partly open;

FIG. 13 is a further view showing the flap fully open and also illustrating a plant rooted in growing medium on one side of the wall panel growing through the opening in the panel;

FIG. 14 is a broken perspective view of an irrigation tube for use with the invention;

FIGS. 15a to 15j are diagrammatic representations of steps in the assembly of a container according to the invention;

FIG. 16 shows diagrammatically a larger assembled container;

FIG. 17 is an elevation of a further wall panel;

FIG. 18 is an underneath view of a lower end cap for a container to be formed using the wall panel of FIG. 17;

FIG. 19 is an elevation of the end cap of FIG. 18; and

Figure 20:
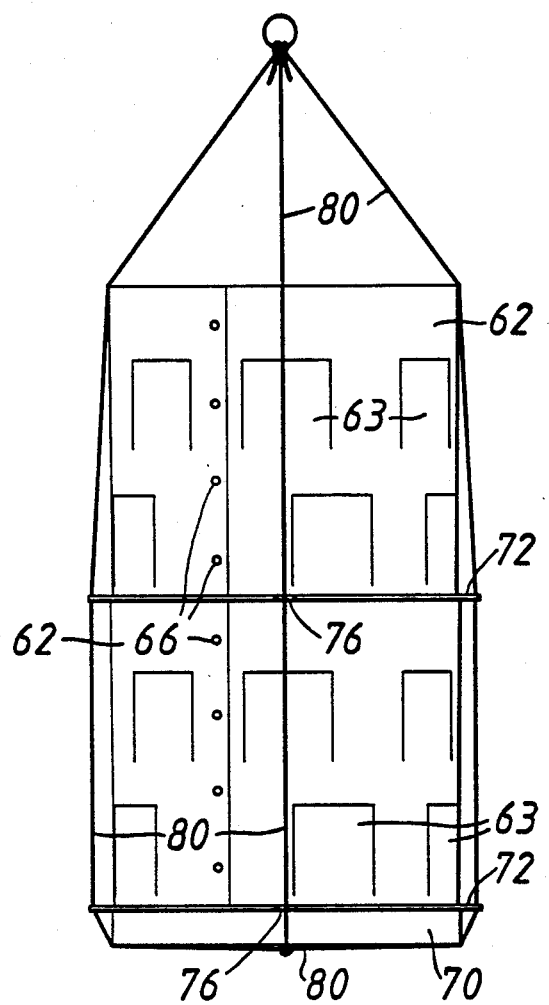
FIG. 20 is an elevation of a composite dual container system using the components shown in FIGS. 17 to 19.

In the drawings, it can be seen from FIG. 1 that connector 12 is of the same height as the wall panel 10. The panel is rectangular and has vertical grooves 14 on each face a short distance from the vertical side edges of the panel. The panel also includes an array of hinged square flaps 16 formed by making cuts 18 through the panel along three sides of each square.

The panel is typically 1 m in height. Alternative panel heights may be 0.5 and 1.5 mm, for example. The flaps may be about 15 cm square.

FIG. 2 shows the four grooves 14 in each panel 10 more clearly, at an enlarged scale.

FIG. 3 shows that the connector 12 has an H section, defining opposite channels 20 for receiving the panel edges. Each channel has a pair of continuous beads 21 formed on opposite side walls. The beads are complementary to the grooves 14 in the panels so that when the panel edges are pushed into the channels 20 in the connector, as shown in FIG. 4, the beads engage with the grooves and hold the panel edges securely in the connector.

FIG. 5 illustrates an alternative connector 12' joining the adjacent edges of two wall panels 10' which, instead of the grooves 14, have their edge regions roughened by milling. The beads 21 are replaced by a plurality of inwardly raked teeth 22 which allow the panel edges to be pressed into the channels but grip the rough panel edges sufficiently well to join the panels securely together. The connector 12' is curved in section, illustrating how a connector can continue the curve of curved panel walls. If desired, the connector channels can be angled to form an angled joint between wall panels.

FIG. 6 shows a panel 23 with integral connector means 24 and 25 formed on opposite vertical side edges. Connector means 24 is a simple return of the panel edge to form a hook, while connector means 25 is a return of the panel edge towards the opposite face of the panel. In the case of connector means 25, the return is offset by means of a stagger 26 in the wall panel between the return and the body of the panel. The stagger is spaced from the returned edge of the connector means 25 by a distance which is sufficient to allow the returned portion of the other connector means 24 to enter. The offset is approximately three times the panel wall thickness, so that the panel edges can be brought together, as shown in FIG. 7, with the panel walls aligned on either side of the interconnected edges.

The connection shown in FIG. 7 can be made by flexing the wall panel 23 as shown by the arrows in FIG. 6 until the connector means 24 and 25 are brought together. When the returns are hooked together, a single cylindrical container will have been formed from a single wall panel. The stiffness of the panel will tend to spring the panel edges apart, which will in fact hold the joint together in this configuration. Once the container is filled with growing medium, the connection will be secure.

For the connection shown in FIG. 8, a connector 12' is used to connect edge-to-edge two panels 10"a and 10"b.

The connector 12" comprises two deep channels 28a and 28b sharing a common base 29. One arm 30a, 30b of each channel is formed with an inwardly directed flange 32a, 32b. The other arm 31a, 31b of each channel is arranged close to or against the flange 32a, 32b. The arms 31a, 31b extend further from the base 29 than do the arms 30a, 30b, so that the outer part of the arm 31a and the inturned flange 32a, and the outer part of the arm 31b and the inturned flange 32b, form guides into the mouth of each channel.

As shown in FIGS. 9 and 10 the panel 10" has a plurality of alternating full cuts and half-cuts or short grooves along a line 27 near an edge 33 of the panel. The cuts and half-cuts are sufficient to render the panel foldable along the line 27, with the half-cuts on the outside of the fold, but still allow the resilience of the material of the panel to tend to straighten the panel if the folding action is released from it.

Thus to effect an edge-to-edge joint between two panels, each is folded along its respective line of weaknes. The folded edge 33 is then pushed between the arms 30, 31 of each channel 28 until the folded edge 33 of each panel passes the end of each flange 32. At this point the folding forces on the panels will be released so that the edges 33 snaps against the inside of the arms 30. If it is attempted to withdraw the panel 10" from the channel 28, the folded edge 33 passes behind the flange 32 which thereby prevents the panel from being withdrawn further.

The arms 31 are on the inner face of the container wall and form a moisture seal against the wall panels 10.

If it is desired to separate the panels, this can simply be effected by drawing the connector 12" from between them in a direction parallel to the edges 33 thereof. An alternative assembly method is to reverse this separation procedure.

The panels and connector means described are essentially of uniform section, so that they can be manufactured by extrusion processes. The flaps together with their associated openings in the panels will of course be cut after extrusion in a separate operation, with no waste of material.

The material of the panels is preferably plastics, and is selected so that, at a suitable wall panel thickness, the panels are generally stiff but still resiliently flexible. The panels should be capable of supporting their own weight when standing on edge; and when the panel edges are joined by connector means to form a continuous container wall, the panels should also be sufficiently stiff not to sag or collapse when the container is filled with damp growing medium. A polypropylene thermoplastics material is found to be particularly suitable to this end, and is suitable for extrusion.

The resilient flexibility of the wall panels allows them to be used in curved walls without being permanently deformed, so that they can be reused in other containers. Additionally, it allows the use of integral closure means, such as the flaps 16, for the panel openings, and allows folding of the panel edges for forming the connection illustrated in FIG. 8.

The flaps 16 are shown most clearly in FIGS. 11 to 13. The hinge for each flap is defined by a shallow hinge cut 34 made into the wall panel 10 from the side face that is to be on the inside of the assembled container. This allows the flap to hinge outwardly more freely than if no hinge cut were to be made.

The non-linear cut 18 made around the remaining three sides of the flap is angled to give a lip 36 at the cut edge of the flap towards the inner face of the flap and a lip 38 at the cut edge of the panel towards the outer face of the panel. The angle is selected to give a small overlap between the lips, allowing the flap to be snapped into and out of the wall panel. FIG. 13 shows a flap 16 open, leaving an opening in the wall panel through which a plant 40, rooted in growing medium 42, can grow.

The cuts 34 and 18 are shown with an exaggerated width for clarity; no material will normally be removed from the panels when these cuts are made, and their opposite cut faces will be abutting each other.

As has been described, when the panel 10 is curved so that the hinge line is curved, the flaps will tend to have stable open and closed positions. FIG. 13 shows a stable open position in which the tendency for the flap to open further to relieve the local distortion in the curved panel is balanced by the resistance of the hinge to further opening. The stiffness of the hinge will be governed by the depth of the hinge cut 34 and the stiffness of the wall panel material. With suitable panel dimensions and materials the flap may initially be opened through about 45° for plating seedlings, which position can be maintained. The flap may be opened further as the plant grows, and may be pushed further open by the growing plant itself.

The flaps are usually opened by inserting a thin tool through the cut 18 and levering the flap open. If required, the flaps may have small cut-out portions to enable them to be more easily pulled open by a finger or tool.

The cylindrical irrigation tube 44 shown in FIG. 14 is slightly longer than the height of the wall panels and has two end caps. Only the lower end cap 46 is shown; the upper end cap is removed whenever irrigation water is to be added to the tube. A large number of small apertures 48 are provided through the tube wall to allow water to seep from the tube into the surrounding growing medium at an acceptable rate.

The assembly of a container from the components described is illustrated in FIGS. 15a to 15j. A flat wall panel 10 (FIG. 15a) is flexed (FIG. 15b) to bring its opposite vertical side edges together (FIG. 15c), whereupon the edges are pressed or slid into the channels of a connector 12 to form a cylindrical tube (FIG. 15d).

The lower end of the tube is fitted into an end cap 50 (FIGS. 15e, 15f) to establish a container with a continuous curved side wall and a base. Four irrigation tubes 44 are then placed in the container (FIG. 15g), which is then filled with growing medium 42 (FIG. 15h). The top of the container is then closed with a second cap 50 (FIGS. 15i, 15j).

It will be seen that the caps 50 are provided with four spaced circular apertures 52. These are of the same diameter as the irrigation tubes. The apertures 52 in the top cap 50 pass over the tubes, so that the tubes project through the cap. The irrigation tubes 44 can then in turn be capped with caps 46 (FIG. 15). The container base cap 50 is arranged with its apertures 52 between the irrigation tubes, to act as drain holes away from the irrigation tubes.

A larger assembled container 54 is shown in FIG. 16. This is made up of a plurality of wall panels 10 joined by an equal number of connectors 12. Instead of the caps 50, the container is assembled on a plastics sheet 56 and the growing medium is covered with a second plastics sheet 58. Slits 60 in the covering sheet 58 allow irrigation tubes 44 to pass through the sheet. The plastics sheets, especially the top sheet 58, are preferably flexible, black (to avoid light transmission) and UV stabilised.

Once a container system in accordance with the invention has been assembled, filled with growing medium and irrigated, selected flaps 16 can be opened to reveal openings in the container walls that can be planted with plant seedlings. As grown plants are removed, such as when harvesting vegetables, the openings can be closed again to prevent water and soil loss. When the growing season is over, the container can be dismantled and the growing medium can be kept, discarded or treated as may be required. The components of the container can be re-used, either to reassemble a similar container or to build other larger or smaller containers. It can be seen that the containers can be made indefinitely large, by selecting the number of wall panels to be used, and can be adapted for use on scales varying from domestic to commercial. The panels complete with closures can be packed flat for storage or shipping.

FIGS. 17 to 19 show elements of a miniature container system for indoor or small garden use, shown assembled in FIG. 20. A single wall panel 62 having openable flaps 63 is provided on opposite side edges with a row of four apertures 64 (FIG. 17) which in combination with any suitable fastening means, such as press studs or blind rivets 66 (FIG. 20), which are receivable therein when the apertures are overlapped, comprise connector means for tying the edges together to form a cylindrical container. Four spaced notches 68 are provided in one long edge of the panel.

Lower end cap 70 is formed as a shallow cylindrical tray with a horizontal external rim flange 72. In the under surface of the tray are two mutually perpendicular diametrical indented grooves 74, and four notches 76 are made in the rim flange above the four ends of the grooves.

In the assembled container (FIG. 20) the wall panel 62 is a snug fit in the end cap 70. Notches 68 accommodate the grooves 74. Two or more containers can be stacked to form a composite container system: the lower end cap of an upper container can be inserted into the open top of a lower container. This may be done before the upper fastening means 66 of the lower container are connected. There will generally be adequate tolerance in the flexible wall panel 62 to permit wrapping the upper edge around the lower end cap 70 of the upper container. In order to permit proper irrigation of the lower container or containers, the lower end caps of all but the lowest container may have openings 78 punched out between the grooves 74; the sites of these openings may be pre-formed of thinner material or with a weakened circumference.

The whole container system can be suspended by cords 80 which are located by the grooves 74 and notches 76.

Many advantages of the invention will be apparent from the foregoing. The invention is capable of growing a great variety of plants, from herbs, bedding plants and bulbs up to vegetables on a domestic or commercial scale. With its versatility and durability, its economy of water and fertiliser usage, and its economy of manufacture, packaging and shipping, it is suitable for use in many third world countries, including hot and arid regions, as well as in more temperate western countries.

I claim:

1. A container for growing plants in a growing medium which comprises:
   at least one wall panel provided with openings through which plants can be grown, said one wall panel being generally stiff but capable of being resiliently flexed between planar and curved configurations, being essentially planar in its unflexed state, and being vertical and curved in ground plan in the assembled container;
   closure means for said openings in said wall panel, said closure means comprising flaps which are integral with the panel, which lie in the plane of the wall panel when closed, which are formed by making cuts through the panel, which open outwardly to form the openings on horizontal hinges defined between opposite ends of the cuts at the lowermost edges of the flaps, and which are retained in the openings when the flaps are reclosed; and
   panel connector means connecting together adjacent wall panel edges to form a continuous container wall.

2. A container according to claim 1 wherein the hinges are further defined by a shallow cut or groove made into the material of the panel along the line of a hinge on the inner face of the panel, reducing the panel stiffness at the hinge line.

3. A container according to claim 1 wherein the cuts in the panel that form the flaps are made at an angle to the panel surface, so that angled lips are formed on the cut edges, the lips on the flap edges being towards the inner faces of the flaps and the lips on the panel being towards the outer face of the panel, the angle of the cuts being selected so that there is a snap action between the lips sufficient to normally retain the flaps in the opening when the flaps are closed.

4. A container according to claim 1 wherein the cuts in the panel that form the flaps are made at an angle to the panel surface, so that angled lips are formed on the cut edges, the lips on the flap edges being towards the inner faces of the flaps and the lips on the panel being towards the outer face of the panel, the angle of the cuts being selected so that there is a snap action between the lips sufficient to normally retain the flaps in the opening when the flaps are closed, and wherein the hinges are further defined by a shallow cut or groove made into the material of the panel along the line of a hinge on the inner face of the panel, reducing the panel stiffness at the hinge line.

5. A container according to claim 1 wherein the panel connector means comprises: an elongate connector member of a length substantially equal to the lengths of the panel edges to be joined, provided with two channels extending along parallel lines or axes, for receiving and engaging two panel edges; and complementary gripping surfaces provided on the panel wall surfaces that are to be received in the channels and on the inside wall surfaces of the channels.

6. A container according to claim 1 wherein the panel connector means comprises: an elongate connector member of a length substantially equal to the lengths of the panel edges to be joined, said connector member having two channels for receiving and engaging two panel edges, each channel being defined between two arms and at least one arm of each channel being provided with an inwardly directed flange; and means enabling the panel to be resiliently folded adjacent its edge, such that when a folded edge of a panel is inserted into a channel said folded edge engages said flange, preventing the panel from being withdrawn outwardly from the channel.

7. A container according to claim 6 wherein the means enabling the panel to be folded comprises a line of localised weakening of the panel adjacent the edge thereof.

8. A container system according to claim 1 further including at least one irrigation tube imbedable vertically in the growing medium, the tube being provided with a plurality of side apertures and having an open or openable upper end.

* * * * *